(12) United States Patent
Wagner et al.

(10) Patent No.: US 12,296,811 B2
(45) Date of Patent: May 13, 2025

(54) VEHICLE BRAKE PEDAL WITH LINEAR PEDAL RESISTANCE AND DAMPENER ASSEMBLY AND FORCE/POSITION SENSOR

(71) Applicant: CTS Corporation, Lisle, IL (US)

(72) Inventors: Ryan Andrew Wagner, Goshen, IN (US); Jeffrey John Bilik, Granger, IN (US)

(73) Assignee: CTS Corporation, Lisle, IL (US)

( * ) Notice: Subject to any disclaimer, the term of this patent is extended or adjusted under 35 U.S.C. 154(b) by 672 days.

(21) Appl. No.: 17/572,937

(22) Filed: Jan. 11, 2022

(65) Prior Publication Data

US 2022/0219659 A1 Jul. 14, 2022

Related U.S. Application Data

(60) Provisional application No. 63/136,878, filed on Jan. 13, 2021.

(51) Int. Cl.
*B60T 8/40* (2006.01)
*G05G 1/38* (2008.04)
*G05G 5/03* (2008.04)

(52) U.S. Cl.
CPC ............ *B60T 8/409* (2013.01); *B60T 8/4086* (2013.01); *G05G 1/38* (2013.01); *G05G 5/03* (2013.01);
(Continued)

(58) Field of Classification Search
CPC .... B60T 8/4086; B60T 8/409; B60T 2220/04; G05G 1/38; G05G 5/03; G05G 2505/00
See application file for complete search history.

(56) References Cited

U.S. PATENT DOCUMENTS 2,659,164 A 11/1953 Durham
3,636,760 A 1/1972 Shoberg
(Continued)

FOREIGN PATENT DOCUMENTS

CN 201989768 U 9/2011
DE 19781694 T1 3/1999
(Continued)

OTHER PUBLICATIONS

International Search Report for Application No. PCT/US2023/072554, dated Dec. 18, 2023 (12 pages).
(Continued)

*Primary Examiner* — Nicholas J Lane
(74) *Attorney, Agent, or Firm* — Michael Best & Friedrich LLP

(57) ABSTRACT

A vehicle pedal resistance and dampener assembly includes a dampener module defining an interior fluid-filled cavity and adapted for generating a dampening force on the vehicle pedal. A pedal resistance module generates a resistance force on the vehicle pedal. The dampener module and the resistance module are moveable relative to each other. A shaft in the dampener module extends into and is moveable in a fluid-filled sleeve in the resistance module. A pedal position sensor senses and measures the position of the vehicle pedal. A pedal force sensor senses and measures the force on the vehicle pedal. A first resistance spring is located in the sleeve of the pedal resistance module, a second resistance spring surrounds the sleeve of the pedal resistance module, a third resistance spring surrounds the shaft of the dampener module, and a fourth resistance spring surrounds the third resistance spring.

13 Claims, 10 Drawing Sheets

(52) U.S. Cl.
CPC ...... *B60T 2220/04* (2013.01); *G05G 2505/00* (2013.01)

(56) References Cited

U.S. PATENT DOCUMENTS

| | | |
|---|---|---|
| 4,120,387 A | 10/1978 | Otteblad et al. |
| 4,206,636 A | 6/1980 | Hendrix |
| 4,395,883 A | 8/1983 | Melinat |
| 4,888,997 A | 12/1989 | Eckert et al. |
| 4,914,388 A | 4/1990 | Kalista et al. |
| 5,115,186 A | 5/1992 | Reinartz et al. |
| 5,168,750 A | 12/1992 | Kurtz |
| 5,333,706 A | 8/1994 | Mori |
| 5,335,563 A | 8/1994 | Yamamoto et al. |
| 5,350,225 A | 9/1994 | Steiner et al. |
| 5,385,068 A | 1/1995 | White et al. |
| 5,416,295 A | 5/1995 | White et al. |
| 5,427,442 A | 6/1995 | Heibel |
| 5,564,797 A | 10/1996 | Steiner et al. |
| 5,590,937 A | 1/1997 | Heibel |
| 5,793,007 A | 8/1998 | Matsumoto |
| 5,839,280 A | 11/1998 | Troester et al. |
| 5,962,997 A | 10/1999 | Maisch |
| 6,008,604 A | 12/1999 | Maisch |
| 6,105,737 A | 8/2000 | Weigert et al. |
| 6,186,026 B1 | 2/2001 | Shaw et al. |
| 6,213,572 B1 | 4/2001 | Linkner, Jr. et al. |
| 6,217,131 B1 | 4/2001 | Schanzzenbach |
| 6,226,586 B1 | 5/2001 | Luckevich et al. |
| 6,238,011 B1 | 5/2001 | Heckmann |
| 6,253,635 B1 | 7/2001 | Huber |
| 6,270,172 B1 | 8/2001 | Shirai et al. |
| 6,289,762 B1 | 9/2001 | Silva |
| 6,298,746 B1 | 10/2001 | Shaw |
| 6,305,506 B1 | 10/2001 | Shirai et al. |
| 6,330,838 B1 | 12/2001 | Kalsi |
| 6,367,886 B1 | 4/2002 | Shaw |
| 6,390,565 B2 | 5/2002 | Riddiford et al. |
| 6,405,117 B1 | 6/2002 | Allen et al. |
| 6,408,712 B1 | 6/2002 | Venkata et al. |
| 6,412,882 B1 | 7/2002 | Isono et al. |
| 6,422,658 B1 | 7/2002 | Valeriano et al. |
| 6,431,304 B1 | 8/2002 | Smythe |
| 6,446,500 B1 | 9/2002 | Marquardt et al. |
| 6,450,588 B2 | 9/2002 | Grote et al. |
| 6,464,306 B2 | 10/2002 | Shaw et al. |
| 6,471,304 B1 | 10/2002 | Deml et al. |
| 6,531,667 B2 | 3/2003 | Becker et al. |
| 6,542,793 B2 | 4/2003 | Kojima et al. |
| 6,554,088 B2 | 4/2003 | Severinsky et al. |
| 6,554,744 B2 | 4/2003 | Schmidt |
| 6,571,662 B1 | 6/2003 | Kolita |
| 6,577,119 B1 | 6/2003 | Yaddehige |
| 6,580,352 B1 | 6/2003 | Pino et al. |
| 6,591,710 B1 | 7/2003 | Shaw |
| 6,619,039 B2 | 9/2003 | Zehnder, II et al. |
| 6,658,963 B2 | 12/2003 | Yaddehige |
| 6,679,135 B1 | 1/2004 | Faigle et al. |
| 6,684,987 B2 | 2/2004 | Stachowski et al. |
| 6,736,233 B2 | 5/2004 | Beishline et al. |
| 6,744,360 B2 | 6/2004 | Fulks et al. |
| 6,862,950 B2 | 3/2005 | O'Neill |
| 7,134,327 B2 | 11/2006 | Saito et al. |
| 7,198,336 B2 | 4/2007 | Yamamoto et al. |
| 7,331,256 B2 | 2/2008 | Allard et al. |
| 7,347,510 B2 | 3/2008 | Schluter |
| 7,395,734 B2 | 7/2008 | Fujiwara et al. |
| 7,401,865 B2 | 7/2008 | Shaw |
| 7,438,368 B2 | 10/2008 | Kohler et al. |
| 7,614,320 B2 | 11/2009 | Fukase |
| 7,650,212 B2 | 1/2010 | Breed et al. |
| 7,712,371 B2 | 5/2010 | Fujiwara |
| 7,726,195 B2 | 6/2010 | Truesdale et al. |
| 7,748,791 B2 | 7/2010 | Joyce |
| 7,748,792 B2 | 7/2010 | Crombez et al. |
| 7,765,893 B2 | 8/2010 | Chol |
| 7,770,491 B2 | 8/2010 | Ritter et al. |
| 7,823,985 B2 | 11/2010 | Hatano |
| 7,856,918 B2 | 12/2010 | Nen et al. |
| 8,042,430 B2 | 10/2011 | Campbell |
| 8,076,874 B2 | 12/2011 | Ueno et al. |
| 8,090,514 B2 | 1/2012 | Tarasinski et al. |
| 8,165,747 B2 | 4/2012 | Ueno et al. |
| 8,239,100 B2 | 8/2012 | Ueno et al. |
| 8,266,982 B2 | 9/2012 | Peniston et al. |
| 8,305,073 B2 | 11/2012 | Kather |
| 8,321,111 B2 | 11/2012 | Ueno et al. |
| 8,322,800 B2 | 12/2012 | Anderson et al. |
| 8,333,130 B2 | 12/2012 | Fujiwara |
| 8,340,863 B2 | 12/2012 | Karatsinides |
| 8,359,140 B2 | 1/2013 | Kodaka et al. |
| 8,496,302 B2 | 7/2013 | Fukushima |
| 8,522,640 B2 | 9/2013 | Bryce |
| 8,523,297 B2 | 9/2013 | Morishita |
| 8,596,162 B2 | 12/2013 | Nozu et al. |
| 8,634,985 B2 | 1/2014 | Zettel et al. |
| 8,635,930 B2 | 1/2014 | Willemsen et al. |
| 8,706,358 B2 | 4/2014 | DeWitt |
| 8,706,375 B2 | 4/2014 | Ajiro |
| 8,707,820 B2 | 4/2014 | Fujiwara |
| 8,726,654 B2 | 5/2014 | Cagnac et al. |
| 8,777,331 B2 | 7/2014 | Fukushima |
| 8,806,976 B1 | 8/2014 | Soltys et al. |
| 8,814,279 B2 | 8/2014 | Sekiya et al. |
| 8,833,072 B2 | 9/2014 | Sprocq et al. |
| 8,850,900 B2 | 10/2014 | Isono et al. |
| 8,874,343 B2 | 10/2014 | Anderson |
| 8,893,579 B2 | 11/2014 | Fujiwara et al. |
| 8,931,368 B2 | 1/2015 | Fujiwara et al. |
| 8,944,528 B2 | 2/2015 | Pursifull et al. |
| 9,045,017 B2 | 6/2015 | Buettner et al. |
| 9,134,748 B2 | 9/2015 | Fujiwara |
| 9,162,655 B2 | 10/2015 | Murayama et al. |
| 9,221,338 B2 | 12/2015 | Gauthier |
| 9,254,829 B2 | 2/2016 | Jeon et al. |
| 9,260,088 B2 | 2/2016 | Shand et al. |
| 9,266,507 B2 | 2/2016 | Shand et al. |
| 9,340,193 B2 | 5/2016 | Ganzel |
| 9,399,462 B2 | 7/2016 | Awadi et al. |
| 9,403,516 B2 | 8/2016 | Strengert et al. |
| 9,442,030 B2 | 9/2016 | Fujiwara et al. |
| 9,465,402 B2 | 10/2016 | Kaiser |
| 9,501,083 B2 | 11/2016 | Zhou et al. |
| 9,505,385 B2 | 11/2016 | Yasui et al. |
| 9,539,993 B2 | 1/2017 | Crombez et al. |
| 9,566,964 B2 | 2/2017 | Jurgens |
| 9,580,056 B2 | 2/2017 | Ishino et al. |
| 9,582,025 B2 | 2/2017 | Jayasuriya et al. |
| 9,592,811 B2 | 3/2017 | Deng et al. |
| 9,616,861 B2 | 4/2017 | Soltys et al. |
| 9,631,918 B2 | 4/2017 | Weiberle et al. |
| 9,651,634 B2 | 5/2017 | Kang |
| 9,676,375 B2 | 6/2017 | Matsuoka et al. |
| 9,707,950 B2 | 7/2017 | Wessner et al. |
| 9,740,233 B2 | 8/2017 | Fujiwara et al. |
| 9,804,047 B2 | 10/2017 | Pagani et al. |
| 9,815,367 B2 | 11/2017 | Maruyama et al. |
| 9,821,776 B2 | 11/2017 | Mayer |
| 9,829,402 B2 | 11/2017 | Beason et al. |
| 9,845,085 B2 | 12/2017 | Besier et al. |
| 9,963,130 B2 | 5/2018 | Tsuchiya |
| 9,989,987 B2 | 6/2018 | Fujiwara |
| 10,081,340 B2 | 9/2018 | Szymczak |
| 10,086,806 B2 | 10/2018 | Pennala et al. |
| 10,112,587 B2 | 10/2018 | Richards et al. |
| 10,124,774 B2 | 11/2018 | Kitaguchi et al. |
| 10,137,870 B2 | 11/2018 | Decker et al. |
| 10,155,505 B2 | 12/2018 | Christoff et al. |
| 10,166,954 B2 | 1/2019 | Houtman et al. |
| 10,173,661 B2 | 1/2019 | Rifici et al. |
| 10,175,712 B2 | 1/2019 | Kaijala |
| 10,239,531 B2 | 3/2019 | Kilmurray et al. |
| 10,248,152 B2 | 4/2019 | Kim et al. |
| 10,296,036 B2 | 5/2019 | Cosby et al. |

(56) References Cited

U.S. PATENT DOCUMENTS

| | | |
|---|---|---|
| 10,296,037 B2 | 5/2019 | Henrikson |
| 10,343,657 B2 | 7/2019 | Street et al. |
| 10,351,117 B2 | 7/2019 | Isono |
| 10,421,447 B2 | 9/2019 | Leiber et al. |
| 10,507,811 B2 | 12/2019 | Tandler et al. |
| 10,525,959 B2 | 1/2020 | Knechtges et al. |
| 10,549,737 B2 | 2/2020 | Leiber et al. |
| 2001/0052727 A1 | 12/2001 | Betts |
| 2002/0100341 A1 | 8/2002 | Kumamoto et al. |
| 2002/0108463 A1 | 8/2002 | Shaw et al. |
| 2002/0117893 A1 | 10/2002 | Shaw et al. |
| 2003/0090150 A1 | 5/2003 | Woo |
| 2003/0205931 A1 | 11/2003 | Muller et al. |
| 2004/0004393 A1 | 1/2004 | Richard |
| 2004/0040408 A1 | 3/2004 | Shaw et al. |
| 2004/0145322 A1 | 7/2004 | Trutschel et al. |
| 2004/0187625 A1 | 9/2004 | Schiel et al. |
| 2004/0251095 A1 | 12/2004 | Simard et al. |
| 2005/0082909 A1 | 4/2005 | Constantakis et al. |
| 2005/0217414 A1 | 10/2005 | Gibson |
| 2005/0223836 A1 | 10/2005 | Gibson |
| 2006/0027096 A1 | 2/2006 | Giering et al. |
| 2006/0064977 A1 | 3/2006 | Ohlig et al. |
| 2006/0185469 A1 | 8/2006 | Schlabach |
| 2006/0224284 A1 | 10/2006 | Ueno et al. |
| 2007/0068306 A1 | 3/2007 | Herrick et al. |
| 2007/0112473 A1 | 5/2007 | Ueno et al. |
| 2007/0159126 A1 | 7/2007 | Nobuyasu et al. |
| 2007/0193401 A1 | 8/2007 | Campbell |
| 2007/0296268 A1 | 12/2007 | Shaw et al. |
| 2008/0276749 A1 | 11/2008 | Stewart et al. |
| 2011/0041647 A1 | 2/2011 | Soltys |
| 2011/0143320 A1 | 6/2011 | McCormick et al. |
| 2013/0074634 A1 | 3/2013 | Al-Rubb |
| 2014/0060239 A1 | 3/2014 | Hemmege Venkatappa et al. |
| 2014/0360177 A1 | 12/2014 | Ryu et al. |
| 2015/0001915 A1 | 1/2015 | Murayama et al. |
| 2015/0001917 A1 | 1/2015 | Murayama et al. |
| 2015/0001918 A1 | 1/2015 | Murayama et al. |
| 2016/0016569 A1 | 1/2016 | Odaira et al. |
| 2016/0160892 A1 | 6/2016 | Schepp et al. |
| 2017/0001615 A1 | 1/2017 | Adler et al. |
| 2017/0067228 A1 | 3/2017 | Hagman |
| 2017/0225664 A1 | 8/2017 | Beever |
| 2017/0334344 A1 | 11/2017 | Salter et al. |
| 2017/0351291 A1 | 12/2017 | Schoenfuss et al. |
| 2018/0043866 A1 | 2/2018 | Monsere et al. |
| 2018/0056963 A1 | 3/2018 | Krueger et al. |
| 2018/0093648 A1* | 4/2018 | Pennala .................. B60T 7/06 |
| 2018/0126966 A1 | 5/2018 | Crum |
| 2018/0141530 A1 | 5/2018 | Kilmurray et al. |
| 2018/0208163 A1 | 7/2018 | Lee et al. |
| 2018/0253121 A1 | 9/2018 | Stuart et al. |
| 2018/0257656 A1 | 9/2018 | Zhao et al. |
| 2018/0259407 A1 | 9/2018 | Hardy et al. |
| 2018/0275712 A1 | 9/2018 | Isono |
| 2018/0283967 A1 | 10/2018 | Kato |
| 2018/0290640 A1 | 10/2018 | Johnson et al. |
| 2018/0370515 A1 | 11/2018 | Kim |
| 2018/0356853 A1 | 12/2018 | Suntharalingam |
| 2019/0092298 A1 | 3/2019 | Bach et al. |
| 2019/0100137 A1 | 4/2019 | Wolf-Monheim |
| 2019/0121385 A1 | 4/2019 | Lee |
| 2019/0271570 A1 | 9/2019 | Zhao et al. |
| 2019/0308597 A1 | 10/2019 | Seibert |
| 2019/0350757 A1 | 11/2019 | Charles |
| 2019/0359194 A1 | 11/2019 | Bindl et al. |
| 2020/0001711 A1* | 1/2020 | Burke .................... G05G 5/05 |
| 2020/0003300 A1 | 1/2020 | Yang |
| 2020/0025113 A1 | 1/2020 | Glugla et al. |
| 2020/0353908 A1* | 11/2020 | Street .................... B60T 8/4086 |
| 2021/0291797 A1 | 9/2021 | Pflaum et al. |
| 2022/0314939 A1 | 10/2022 | Wagner |
| 2023/0114657 A1 | 4/2023 | Wagner et al. |
| 2024/0075910 A1 | 3/2024 | Wagner |

FOREIGN PATENT DOCUMENTS

| | | |
|---|---|---|
| DE | 19755481 A1 | 6/1999 |
| DE | 19825231 A1 | 12/1999 |
| DE | 19510522 C2 | 2/2000 |
| DE | 19836692 A1 | 2/2000 |
| DE | 10043255 A1 | 3/2002 |
| DE | 10341277 A1 | 3/2005 |
| DE | 10347838 A1 | 3/2005 |
| DE | 10347843 A1 | 4/2005 |
| DE | 102004023007 A1 | 12/2005 |
| DE | 102004041733 B4 | 7/2006 |
| DE | 102005033179 A1 | 1/2007 |
| DE | 202007000827 U1 | 4/2007 |
| DE | 1020006001683 A1 | 7/2007 |
| DE | 102007018962 A1 | 10/2008 |
| DE | 102007030312 A1 | 1/2009 |
| DE | 102007035326 A1 | 1/2009 |
| DE | 102010000882 A1 | 7/2010 |
| DE | 202010008405 U1 | 12/2010 |
| DE | 102009055251 A1 | 6/2011 |
| DE | 102010024735 A1 | 12/2011 |
| DE | 102011106396 A1 | 4/2012 |
| DE | 102010061439 A1 | 6/2012 |
| DE | 102011016239 A1 | 10/2012 |
| DE | 102011117264 A1 | 11/2012 |
| DE | 102012024846 A1 | 8/2013 |
| DE | 102013204778 A | 9/2013 |
| DE | 102012106213 A1 | 1/2014 |
| DE | 102013106654 A1 | 1/2015 |
| DE | 102016201784 A1 | 9/2016 |
| DE | 202016106697 U1 | 3/2017 |
| DE | 102004013868 B4 | 8/2017 |
| DE | 102016212931 A1 | 1/2018 |
| DE | 102007047547 B4 | 2/2018 |
| DE | 102016116619 A1 | 3/2018 |
| DE | 102016219219 A1 | 4/2018 |
| DE | 102018100072 A1 | 8/2018 |
| DE | 102017104278 A1 | 9/2018 |
| DE | 102017004518 A1 | 11/2018 |
| DE | 102017211955 A1 | 1/2019 |
| DE | 102017218384 A1 | 4/2019 |
| DE | 102016219622 B4 | 6/2019 |
| DE | 112017004866 T5 | 6/2019 |
| DE | 102008026751 B4 | 3/2020 |
| EP | 0136689 A2 | 4/1985 |
| EP | 0136690 A2 | 4/1985 |
| EP | 0301018 B1 | 6/1992 |
| EP | 0786387 A2 | 7/1997 |
| EP | 1055912 A2 | 11/2000 |
| EP | 1577184 A2 | 9/2005 |
| EP | 1078833 B1 | 11/2005 |
| EP | 1394007 B1 | 8/2007 |
| EP | 1654137 B1 | 10/2008 |
| EP | 1781516 B1 | 6/2010 |
| EP | 2806255 A2 | 11/2014 |
| EP | 2818444 A1 | 12/2014 |
| EP | 2871102 A1 | 5/2015 |
| EP | 2879924 A1 | 6/2015 |
| EP | 2826680 B1 | 2/2016 |
| EP | 3213168 B1 | 7/2018 |
| EP | 2731838 B1 | 9/2018 |
| EP | 3375678 B1 | 2/2020 |
| EP | 2926090 B1 | 3/2020 |
| EP | 3589518 B1 | 4/2021 |
| GB | 2451559 A | 2/2009 |
| JP | H08150263 A | 6/1996 |
| WO | WO2001001066 A1 | 1/2001 |
| WO | 2001040038 A1 | 6/2001 |
| WO | WO20160186979 A1 | 11/2016 |
| WO | 2017202512 A1 | 11/2017 |
| WO | WO2018029472 A1 | 2/2018 |
| WO | WO20180104740 A1 | 6/2018 |

OTHER PUBLICATIONS

International Search Report and Written Opinion for Application No. PCT/US2022/077796 dated Jan. 25, 2023 (13 pages).

(56) References Cited

OTHER PUBLICATIONS

International Search Report and Written Opinion for Application No. PCT/US2022/012012 dated May 3, 2022 (17 pages).
Ams: New Magnetic Position Sensors for automotive applications Support Full ISO26262 Compliance and Provide SysteminPackage (SiP) Format. Business Wire—2016; https://dialog.proquest.com/professional/docview/1784083696/15CC904FA1C11CA0C95/123?accountid=157282 (3 pages).
Chinese Patent Office Action for Application No. 202080033525.9 dated Feb. 4, 2024 (9 pages).

* cited by examiner

VEHICLE BRAKE PEDAL WITH LINEAR PEDAL RESISTANCE AND DAMPENER ASSEMBLY AND FORCE/POSITION SENSOR

CROSS-REFERENCE TO RELATED APPLICATION

This patent application claims priority and benefit of the filing date of U.S. Provisional Patent Application Ser. No. 63/136,878 filed on Jan. 13, 2021, the disclosure and contents of which are expressly incorporated herein in its entirety by reference.

FIELD OF THE INVENTION

This invention relates to a vehicle pedal and, more specifically, a vehicle brake pedal with a linear pedal resistance and dampener assembly incorporating a force/position sensor.

BACKGROUND OF THE INVENTION

Brake-by-wire vehicle pedals such as vehicle brake pedals do not utilize a conventional vacuum or hydraulic system for braking.

There is a desire to replicate or emulate the feel of a conventional vacuum or hydraulic braking system in brake-by-wire vehicle brake pedals.

The present invention is directed to a brake-by-wire vehicle pedal and, more specifically, a vehicle brake pedal including a linear pedal resistance and dampener assembly that replicates or emulates the resistance and dampener feel of a conventional vacuum or hydraulic braking system.

The present invention is also directed to a pedal resistance and dampener assembly that incorporates a pedal force and position sensor.

SUMMARY OF THE INVENTION

The present invention is generally directed to a vehicle pedal resistance and dampener assembly comprising a dampener module defining an interior fluid-filled cavity and adapted for generating a dampening force on the vehicle pedal, a resistance module adapted for generating a resistance force on the vehicle pedal, the dampener module and the resistance module being moveable relative to each other, a pedal position sensor assembly for sensing and measuring the position of the vehicle pedal, and a pedal force sensor assembly for sensing and measuring the force on the vehicle pedal.

In one embodiment, the resistance module comprises a plurality of compressible springs at opposed ends of the resistance and dampener assembly.

In one embodiment, the resistance module comprises first and second springs at each of the opposed ends of the resistance and dampener assembly.

In one embodiment, the first spring surrounds and is spaced from the second spring.

In one embodiment, the dampener module includes a shaft extending through the interior fluid-filled cavity.

In one embodiment, the resistance module includes a fluid-filled interior sleeve, the shaft of the dampener module extending into the sleeve of the resistance module.

In one embodiment, a first ring seal is secured to the sleeve of the resistance module and a second ring seal is secured to the dampener module and moveable relative to the sleeve.

In one embodiment, the vehicle pedal resistance and dampener assembly further comprises a sleeve in the dampener module defining the interior fluid-filled cavity, a shaft in the cavity of the dampener module, a fluid-filled interior sleeve in the resistance module, the shaft of the dampener module extending into the sleeve of the resistance module, a first ring seal surrounding the sleeve of the resistance module, a second ring seal surrounding and moveable relative to the sleeve of the resistance module, a first resistance spring in the resistance module extending between an end of the resistance module and the shaft of the dampener module, a second resistance spring in the resistance module surrounding and spaced from the sleeve of the resistance module, a third resistance spring in the dampener module extending from an end of the dampener module and surrounding the shaft in the dampener module, and a fourth resistance spring in the resistance module surrounding the third resistance spring and extending between the end of the dampener module and the first ring seal.

In one embodiment, the pedal position sensor assembly includes a magnet on one of the dampener module and the resistance module and a position sensor on the other of the dampener module and the resistance module.

In one embodiment, the pedal force sensor assembly includes a pedal force application plate and a pedal force resistor substrate on the resistance module.

In one embodiment, the dampener module, the resistance module, and the pedal force sensing module are positioned in a relationship co-linear with each other and the longitudinal axis of the resistance and dampener assembly.

The present invention is also directed to a vehicle pedal resistance and dampener assembly for a vehicle pedal comprising a pedal resistance member including an interior fluid-filled sleeve, a pedal dampener member including a shaft in a fluid-filled interior chamber, the shaft extending into the sleeve of the pedal resistance member, the pedal resistance member and the pedal dampener member being moveable relative to each other and the shaft and the sleeve being moveable relative to each other.

In one embodiment, the vehicle pedal resistance and dampener assembly further comprises a first pedal resistance spring in the sleeve of the pedal resistance member, a second pedal resistance spring surrounding the sleeve of the pedal resistance member, a third pedal resistance spring surrounding the shaft of the pedal dampener member, and a fourth pedal resistance spring surrounding the third pedal resistance spring.

In one embodiment, the vehicle pedal resistance and dampener assembly further comprises a first ring seal surrounding and fixed to the sleeve of the pedal resistance member, and a second ring seal surrounding and moveable relative to the sleeve of the pedal resistance member in response to the movement of the pedal dampener member and the pedal resistance member relative to each other.

In one embodiment, the interior sleeve of the pedal dampener member defines first and second interior fluid-filled chambers separated by the first ring seal.

In one embodiment, the vehicle pedal resistance and dampener assembly further comprises one or more openings defined in an exterior wall of the sleeve of the pedal resistance member for providing fluid-flow communication between the fluid-filled sleeve of the pedal resistance member and the second interior fluid-filled chamber of the pedal dampener member, and one or more openings defined in the shaft of the pedal dampener member for providing fluid-flow communication between the fluid-filled sleeve of the pedal resistance member and the first interior fluid-filled chamber of the pedal dampener member.

In one embodiment, the vehicle pedal resistance and dampener assembly further comprises a pedal position sensor assembly including a magnet associated with one of the pedal dampener and pedal resistance members, and a pedal position sensor associated with the other of the pedal dampener and pedal resistance members.

In one embodiment, the vehicle pedal resistance and dampener assembly further comprises a pedal force sensor assembly including a pedal force sensor and a plate adapted to exert a force against the pedal force sensor in response to the movement of the pedal dampener member and the pedal resistance member relative to each other.

The present invention is further directed to a vehicle pedal resistance and dampener assembly comprising a resistance module including a fluid-filled interior sleeve, a dampener module including a shaft extending into the sleeve of the resistance module and defining a fluid-filled chamber, the resistance module and the dampener module being moveable relative to each other, a first pedal resistance spring located in the sleeve of the resistance module and extending between an end of the resistance module and the shaft of the dampener module, a second pedal resistance spring located in the resistance module and surrounding the sleeve of the resistance module, a third pedal resistance spring in the chamber of the dampener module, a fourth pedal resistance spring in the chamber of the dampener module surrounding the third pedal resistance spring in the chamber of the dampener module, a first ring seal surrounding and fixed to the sleeve of the resistance module, the third and fourth pedal resistance springs located between an end of the dampener module and the first ring, a second ring seal surrounding and moveable relative to the sleeve of the resistance module, the second pedal resistance spring located between the end of the resistance module and the second ring seal, and a pedal position sensor assembly including a magnet on one of the dampener module or the resistance module and a position sensor on the other of the dampener module or the resistance module.

In one embodiment, the vehicle pedal resistance and dampener assembly further comprises a pedal force sensor on the resistance module.

Other advantages and features of the present invention will be more readily apparent from the following detailed description of the embodiments of the invention, the accompanying drawings, and the appended claims.

BRIEF DESCRIPTION OF THE DRAWINGS

These and other features of the invention can best be understood by the description of the accompanying Figs. as follows.

DESCRIPTION OF THE EMBODIMENTS

Figure 1:
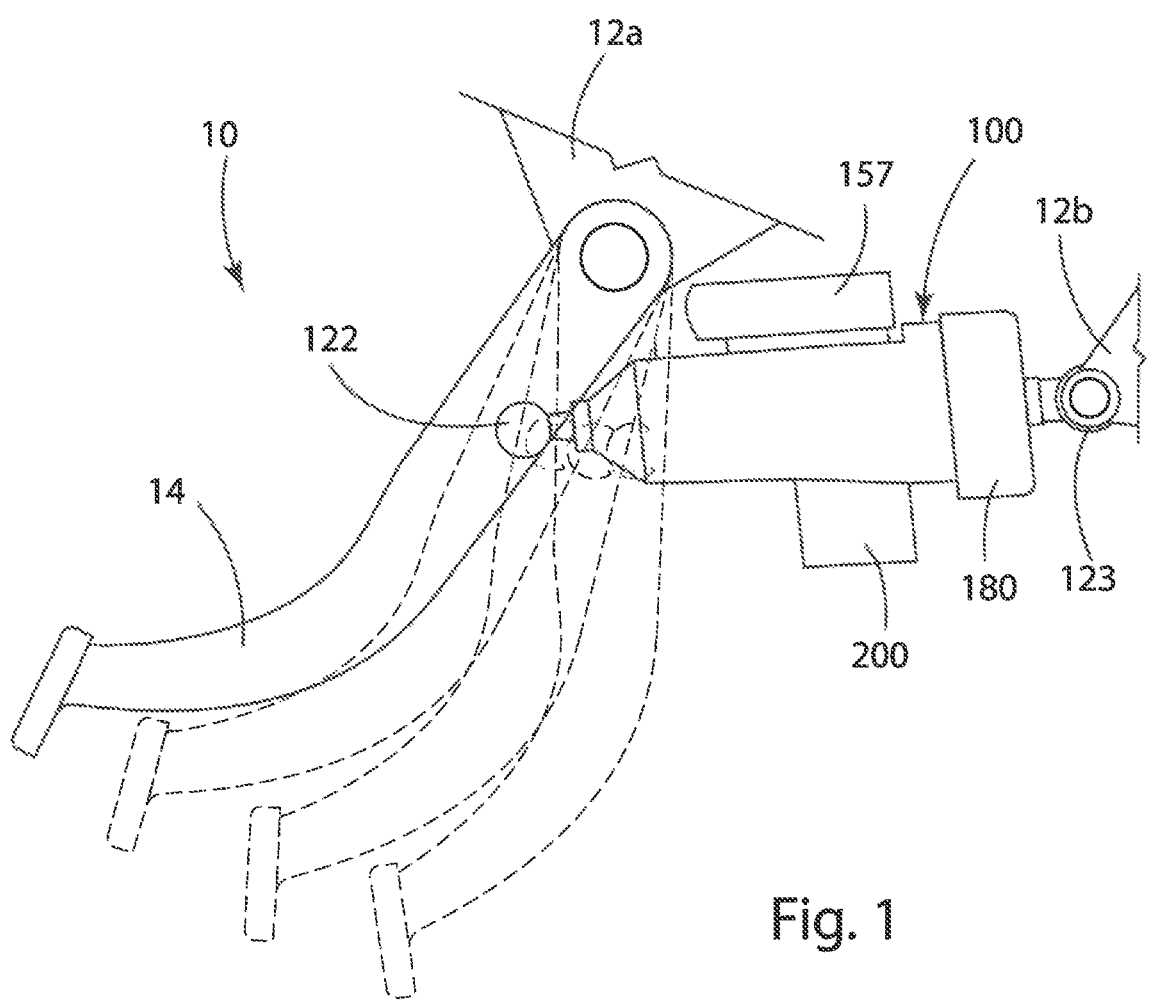
FIG. 1 is a simplified broken perspective view of a vehicle brake pedal incorporating a pedal resistance and dampener assembly in accordance with the present invention.
Figure 2:
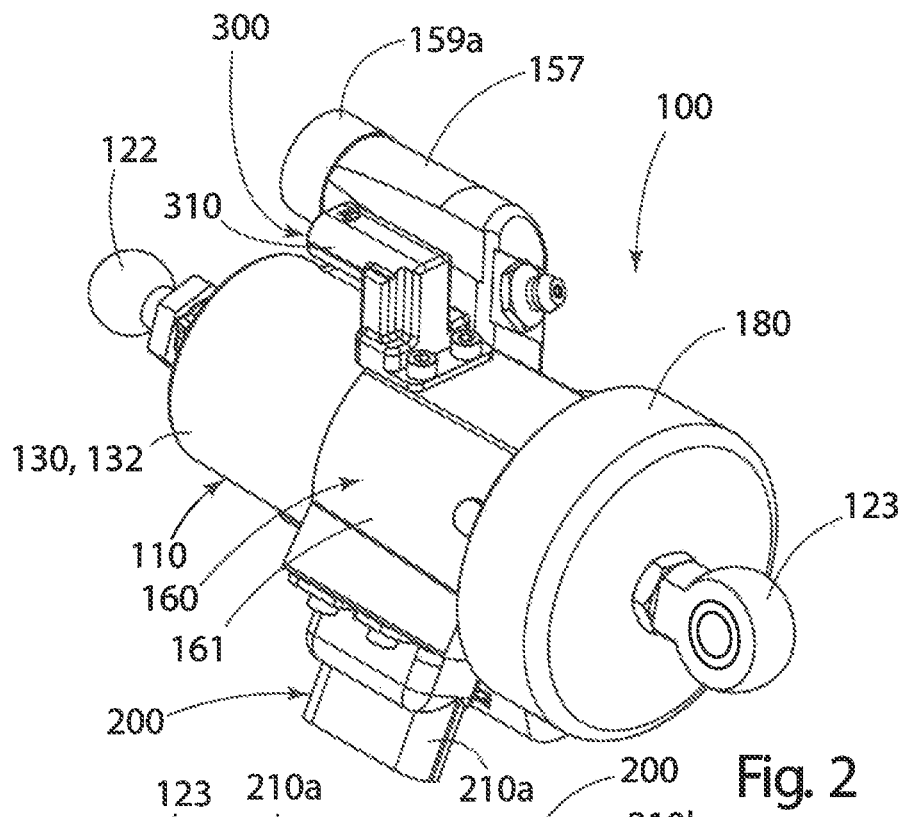
FIG. 2 is a perspective view of the pedal resistance and dampener assembly of the present invention.
Figure 3:
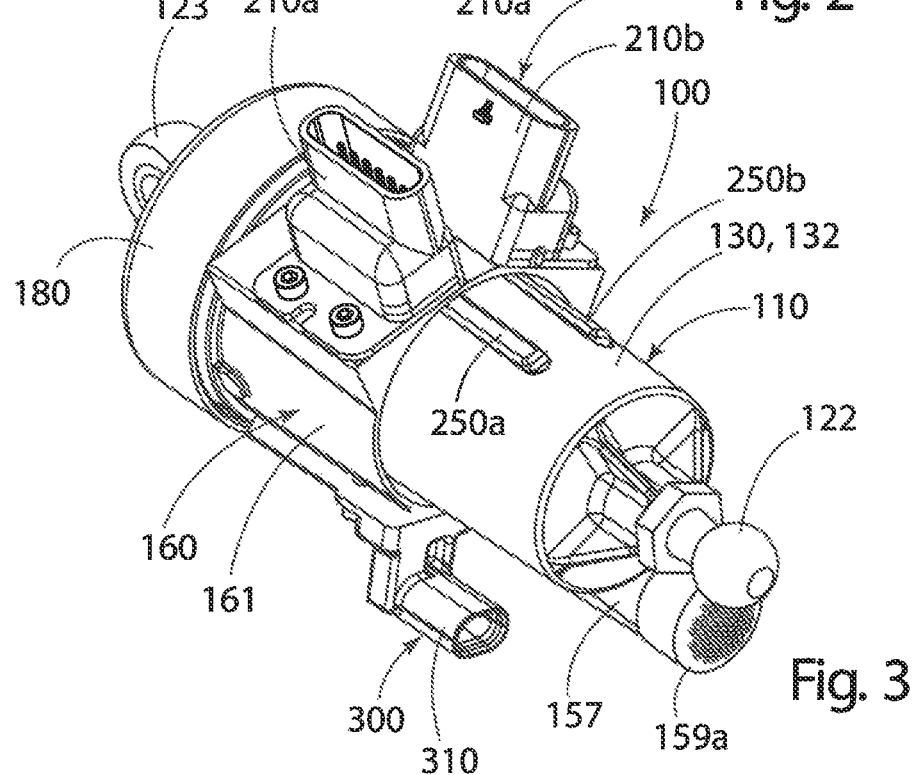
FIG. 3 is another perspective view of the pedal resistance and dampener assembly of the present invention.

FIGS. 1-8 depict a vehicle pedal assembly and, more specifically, a vehicle brake pedal assembly 10 incorporating a linear pedal resistance and dampener assembly or module or member or emulator 100 in accordance with the present invention.

The vehicle brake pedal assembly 10 includes a vehicle base/bracket 12 which is shown in simplified form to include respective base/bracket members 12a and 12b associated with the firewall/floor of the vehicle, an elongate brake pedal 14 pivotally connected for counterclockwise/engaging/braking and clockwise/disengaging/non-braking rotation and movement relative to the pedal base/bracket 12a.

The pedal resistance and dampener assembly 100 is operably coupled to the pedal assembly 10 in a relationship extending between the base/bracket member/vehicle firewall 12b and the pedal 14 and further in a relationship with a first end bracket or ball stud 122 thereof operatively coupled to the pedal 14 and a second opposed end bracket or adjustable eyelet 123 coupled to the pedal base/bracket member 12b.

The pedal resistance and dampener assembly 100 is generally in the form and shape of an elongate hollow cylinder or housing initially comprising an interior liquid-filled cylinder or tubular dampener or dampening force module or member 110 which is adapted for linear movement in response to the movement of the pedal 14 and is adapted to provide a velocity-dependent dampening force response and including a first central generally cylindrical elongate hollow interior cylinder or tubular housing or sleeve 130 including an exterior circumferential wall 132 defining and forming first and second interior hollow elongate cylindrically or tubular shaped fluid-filled receptacles or cavities or chambers 134a and 134b. The sleeve 130 further defines a closed end or wall 131 and an opposed open end 133.

A first interior seal or sealing cap or cartridge or gland or ring or piston 112 covers and seals the interior circumferential surface of the open end 133 of the sleeve 130 of the dampener module 110. An O-ring 112a extends between the exterior circumferential surface of the cap 112 and the interior circumferential surface of the exterior wall 132 of the sleeve 130 for providing a seal between the seal ring or piston 112 and the sleeve 130.

The pedal resistance and dampener assembly 100 further comprises an elongate shaft or rod 140 extending generally centrally through the interior of the chamber 134 of the sleeve 130 of the dampener module 110 in a relationship generally co-linear with the longitudinal axis L of the sleeve 130 and the pedal resistance and dampener assembly 100.

The shaft or rod 140 includes a first end 140a extending through and secured in the interior of a circumferential sleeve bracket or collar 141 that protrudes inwardly into the interior of the chamber 134 from the closed end wall 131 of the sleeve 130. A second opposed end 140b of the shaft or rod 140 extends into the interior of a first end 150a of a second cylindrical sleeve or tube 150 of a resistance module 160 of the pedal resistance and dampener assembly 100 as described in more detail below.

The rod or shaft 140 defines an elongate central interior bore 140c terminating in an opening 140e in the radial end face at the end 140b of the shaft or rod 140. The rod or shaft 140 additionally defines one or more bores or orifices 140d extending between the central bore 140c and the exterior of the rod or shaft 140 and located in the region of the dampener module 110 defining the first interior chamber 134a.

A circumferentially extending central rod seal 152 provides a seal between the ring seal 112 and the exterior circumferential surface of the sleeve 150.

A second interior sealing cap or seal or cartridge or gland or ring or piston 146 in the chamber 134 of the sleeve 130 of the dampener module 110 is secured to and surrounds the exterior circumferential surface of the first end 150a of the sleeve 150 of the resistance module 160.

The cavities or chambers 134a and 134b of the dampener module 110 are defined and located in the interior of the sleeve 130 on opposed sides of the seal ring or piston 146; the cavity or chamber 134b is located between the respective seal rings or pistons 112 and 146; the cavities or chambers 134a and 134b are adapted to vary in size and volume in response to the movement of the dampener module 110; and contain a dampener fluid (not shown) which, in one embodiment, can be a propylene glycol and water mixture.

A stage 3 resistance retainer 153 is in the chamber 134 of the sleeve 130 and surrounds the interior sleeve bracket 141. The retainer 153 is abutted against the interior surface of the closed end wall 131 of the dampening module 110.

A pair of helical springs 154 and 155 are also located in the chamber 134 of the sleeve 130 of the dampener module 110. The springs 154 and 155 are located between the end 131 of the sleeve 130 and the first ring seal 146. The spring 154 comprises a stage 3 resistance spring that surrounds the interior sleeve bracket or collar 141 and includes a first end 154a abutted against the retainer 153. The spring 155 comprises a stage 1 resistance spring that surrounds and is spaced from the spring 154 and the sleeve bracket or collar 141 and includes a first end 155a abutted against the retainer 153 and a second opposed end 155b abutted against the ring seal 146.

A second sleeve bracket or collar 156 protrudes outwardly from the exterior of the closed wall or end 131 of the sleeve 130. The ball joint 122 is threadingly secured and coupled to the sleeve bracket or collar 156.

A hydraulic fluid VER housing or assembly or module 157 extends unitarily outwardly from the exterior circumferential surface or wall 132 of the sleeve 130 of the dampener module 110. The VER housing 157 defines an interior fluid chamber 157a. A VER piston 157b is located in and adapted for back-and-forth linear movement within the interior of the fluid chamber 157a. A VER piston seal 157c extends around the circumference of the VER piston 157b and provides a seal between the VER piston 157b and the interior circumferential surface of the chamber 157b. A zerk 158 is threadingly secured into an aperture 157d defined in the interior of the VER housing 157 and is in fluid flow communication with a fluid conduit 157e which is in fluid flow communication with the interior fluid chamber 157a of the fluid VER housing 157.

The fluid conduit 157e is in turn in fluid flow communication with the fluid chamber 134b defined by the sleeve 130 of the dampener force module 110. A retaining ring 159 is located at and seals one end of the fluid chamber 157a and housing 157. A debris screen 159a surrounds and closes the end of the fluid chamber 157a and housing 157.

The pedal resistance and dampener assembly 100 still further comprises a spring pedal resistance module or member or assembly 160 which is fixed to the vehicle bracket 12b and is comprised of a circumferentially extending and generally tubular shaped shroud or housing 161 that includes a circumferentially extending outer wall 162 defining an interior chamber or cavity 163 and including a first open end 162a surrounding the wall 132 of the sleeve 130 of the dampener module 110 and an opposed radial end wall 162b defining a closed opposed end.

Thus, in the embodiment shown, the pedal resistance module 160 surrounds at least a portion of the dampener module 110 and, more specifically, at least a portion of the wall 162 of the pedal resistance module 160 surrounds at least a portion of the wall 132 of the dampener module 110.

A first collar 164 protrudes and extends inwardly from the radial end wall 162b and extends into the interior chamber 163 of the shroud 161. The collar 164 defines an interior threaded receptacle 164a that receives the threaded shaft 123a of the eyelet bracket 123. The threaded shaft 123a extends through the collar radial end wall 162b and into the collar receptacle 164a.

A second circumferential collar 165 in the interior chamber 163 of the shroud 161 surrounds and is spaced from the first collar 164. The collar 165 also protrudes and extends inwardly from the radial end wall 162b of the shroud 161 of the resistance module 160.

The hollow and elongate sleeve or tube 150 extends in and through the interior chamber 163 of the shroud or housing 161 in a relationship co-linear with the longitudinal axis of the pedal resistance assembly 100 and includes a first end 150a surrounding the end 140b of the shaft 140 in the dampener module 110 and an opposed end 150b abutting against the interior surface of the radial end wall 162b of the shroud 161 and extending into and secured in the gap or space or region defined between the respective collars 164 and 165.

The sleeve or tube 150 defines an interior hollow fluid-filled chamber or cavity 150*c*. Further, the exterior circumferential wall of the sleeve or tube 150 defines a plurality of fluid flow orifices or through-holes 150*d* located in the region of the assembly 100 defining the second interior chamber 134*b* of the dampener module 110.

A seal seat 166 is in the gap or space defined between the respective collars 164 and 165 and is positioned between the sleeve 150 and the collar 165.

A stage 1 resistance helical spring 167 is in and extends longitudinally through the interior of the chamber 150*c* of the sleeve 150 in a relationship co-linear with the longitudinal axis of the pedal resistance assembly 100. A first end 167*a* of the spring 167 surrounds and is abutted against the end 140*b* of the shaft 140 extending into the end 150*a* of the sleeve 150. An opposed end 167*b* of the spring 167 is abutted against the closed end 162*a* of the resistance module 160 and surrounds the collar 164.

A stage 2 resistance helical spring 168 is located in and extends longitudinally through the interior of the chamber 163 of the module 160 in a relationship co-linear with the longitudinal axis of the pedal resistance assembly 100 and further in a relationship surrounding and spaced from the sleeve 150 with a first end 168*a* abutted against a stage 2 resistance retainer 169 in the chamber 163 that surrounds and is slideable relative the sleeve 150 and an opposed end 168*b* abutted against the closed end 162*a* of the resistance module 160 and also surrounding the collar 165.

The pedal resistance and dampener assembly 100 still further comprises a pedal force sensing module or member or assembly 170 comprising a force sensor plate 172 and a force sensor substrate 174 located at the closed end of the resistance module 160 and which are abutted against each other and are seated and located in the interior of a receptacle or recess 162*c* defined in the exterior face of the radial end wall 162*b* of the shroud 161 of the pedal resistance module 160.

A cover 180 at the distal end of the resistance module 160 covers the end wall 162*b* of the shroud 161 and protects the resistance module 160 and the force module 170 from dust and other debris.

In one embodiment, the force sensor substrate 174 is in the embodiment of a strain gauge substrate with Wheatstone bridge strain gauge elements (not shown) mounted thereon as known in the art which are adapted to generate electrical signals in response to the deformation of the substrate in response to the application of a compressive force thereon by the force sensor plate 172 and the ball stud 123 in response to the movement of the dampener module 110 and the resistance module 160 relative to each other in response to the depression of the vehicle pedal 14. In one embodiment, the force sensor substrate 174 and, more specifically, the strain gauge elements thereon, defines a pair of pedal force sensors for redundancy purposes.

The pedal force sensing module or member 170 further comprises the ball stud 123 that includes a collar 123*b* abutted against the exterior face of the force sensor plate 172 and the threaded shaft 123*a* that extends through a center hole 172*a* defined in the force sensor plate 172 and into the threaded interior of the collar 164 defined in the radial end wall 162*b* of the shroud 161 of the pedal resistance module 160. The ball stud 123, the collar 122*b*, and the threaded shaft 123*a* are all positioned in a relationship co-linear with the longitudinal axis of the pedal resistance and dampener assembly 100.

The pedal resistance and dampener assembly 100 still further comprises a combination pedal position and pedal force sensor/sensing connector assembly or module or member 200 including a pair of electrical connectors 210 coupled to and protruding outwardly from the exterior of the pedal resistance module 160 in a generally V-shaped configuration and relationship and, more specifically, in a relationship coupled to and protruding outwardly from the exterior face of the wall 162 of the shroud 161 of the pedal resistance module 160.

The connector assembly 210 defines a pair of separate interior housings 220*a* and 220*b* for a pair of printed circuit boards 230*a* and 230*b* including a pair of position sensing integrated circuits or sensors 240*a* and 240*b* respectively such as for example a pair of Hall Effect ICs or sensors adapted for sensing a change in the magnitude or direction of a magnetic field generated by a pair of respective sensor magnets 250*a* and 250*b* embedded into the wall 132 of the sleeve 130 of the dampener module 110 in response to the movement of the dampener module 110 for sensing and measuring the position of the vehicle brake pedal 14. In the embodiment shown, the respective magnets 250*a* and 250*b* are positioned in a relationship opposed and spaced from the respective Hall Effect ICs 240*a* and 240*b*.

Thus, as described above, the assembly 100 includes a pair of pedal position sensors 240*a* and 240*b* for redundancy purposes.

Although not shown or described in any detail, it is understood that the pair of pedal position sensors defined by the pair of Hall Effect ICs 240*a* and 240*b* and the pair of pedal force sensors defined by the elements of the force sensor substrate 174 are respectively operably coupled to the pair of connectors 210*a* and 210*b* respectively.

The pedal resistance assembly 100 still further comprises a pedal wake-up sensor/sensing connector assembly or module 300 including a connector 310 coupled to and protruding outwardly from the exterior of the pedal resistance module 160 in a relationship diametrically opposed to the pedal position connector assembly 200 and, more specifically, in a relationship coupled to and protruding outwardly from the exterior of the wall 162 of the shroud 161 of the pedal resistance module 160. In the embodiment shown, the connector assembly 310 defines an interior housing 320 for a printed circuit board 330 including a wake-up sensor IC 340 and other related electronics for providing an assembly wake-up function.

In the embodiment of the present invention, the dampener force module 110, the pedal resistance module 160, and the assembly wake-up module 170 of the pedal resistance and dampener assembly 100 are all positioned and oriented in a relationship co-linear with each other and the longitudinal axis of the resistance and dampener assembly 100 with the pedal resistance module 160 positioned between the dampener force module 110 at one end of the assembly 100 and the pedal force module 170 at the other end of the assembly 100.

Moreover, in the embodiment of the present invention, the VER housing 157, the pedal position sensor module 200 and the pedal force sensor module 300 are positioned and oriented in a relationship spaced and off-set from the longitudinal axis of the resistance and dampener assembly 100.

Moreover, in the embodiment shown, the stage 1 outer pedal force resistance spring 155, the stage 1 inner pedal force resistance spring 167, the stage 2 pedal force resistance spring 168, and the stage 3 pedal force resistance spring 154 are all positioned and oriented in a relationship co-linear with each other and the longitudinal axis of the pedal resistance and dampener assembly 100.

Still further, in the embodiment shown, the stage 1 resistance outer spring 155 surrounds and is spaced from the stage 3 resistance spring 154 and both are located and positioned at one end of the assembly 100 between the end wall 131 of the dampener module 110 and the seal ring or piston 146 while the stage 2 resistance spring 168 surrounds and is spaced from the stage 1 resistance inner spring 167 and both are located and positioned at the opposed end of the assembly 100 between the end wall 162b of the resistance module 160 and the seal ring or piston 112.

Thus, in the embodiment shown, the assembly 100 includes a total of four pedal force resistance springs with two such springs 154 and 155 located at one end of the assembly 100 and the other two such springs 167 and 168 located at the opposed end of the assembly 100 with the respective ring seals 112 and 146 positioned and located between and separating the springs 154 and 155 from the springs 167 and 168.

Also, in the embodiment shown, the pedal force module 170 is located at one end of the assembly 100 and more specifically is located at the end of the resistance module 160.

The pedal resistance and dampener assembly 100 is adapted to create and generate linear resistance and dampening forces on the pedal 14 in response to the travel or movement or stroke of the pedal 14 during operation of a vehicle with a brake-by-wire system for the purpose of emulating the resistance and dampening feel of a vehicle with a conventional vacuum or hydraulic braking system.

Figure 4:
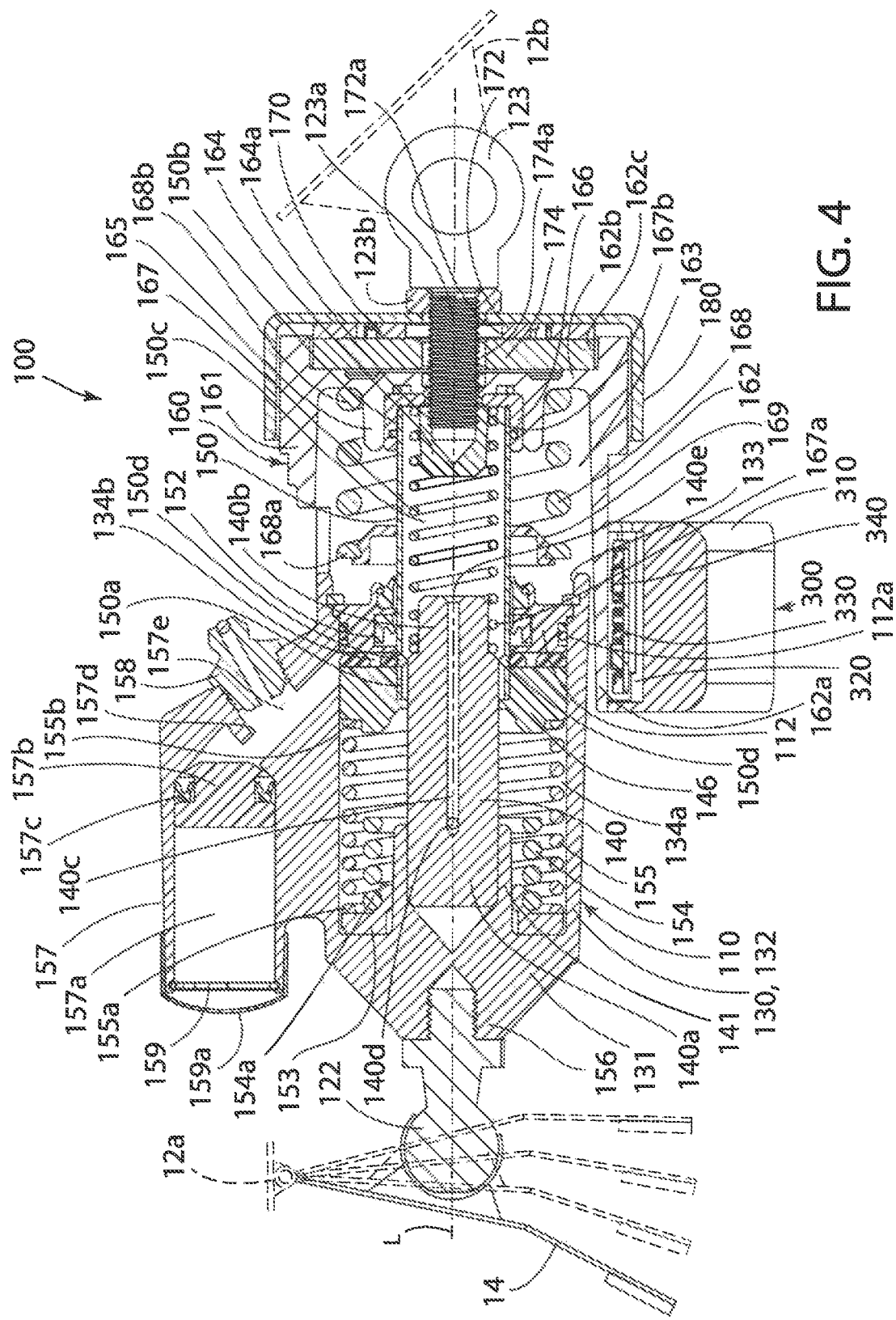
FIG. 4 is a vertical cross-sectional view of the pedal resistance and dampener assembly in its rest or disengaged or non-braking pedal position taken along the longitudinal axis of the pedal resistance and dampener assembly.

FIG. 4 depicts the elements of the pedal resistance and dampener assembly or module or member 100 in the rest or disengaged or non-braking position of the pedal 14 with the distal end 140b of the rod 140 of the dampening module 110 extending partially into the interior chamber or cavity 150c of the tube 150 of the resistance module 160.

Figure 5:
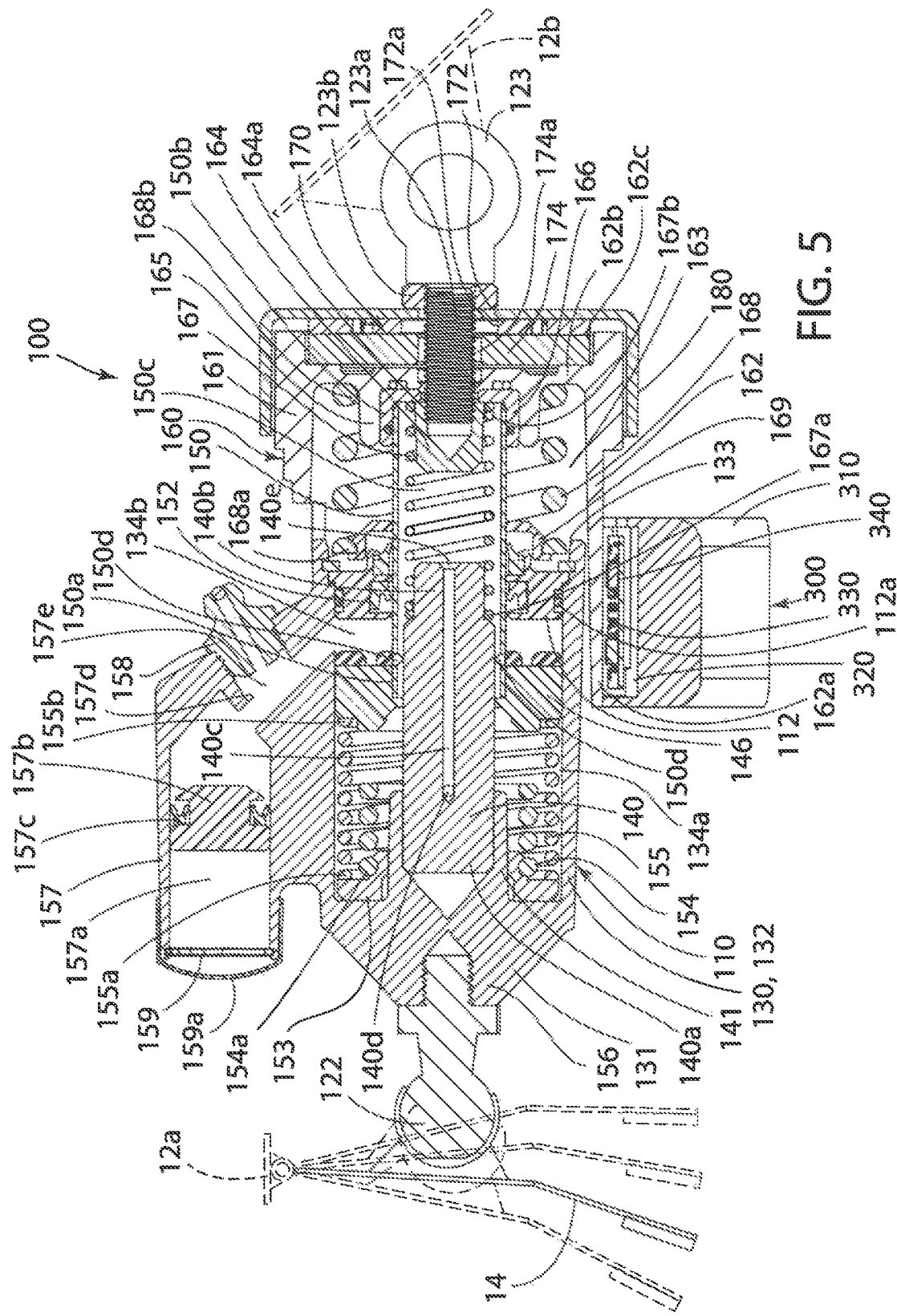
FIG. 5 is a vertical cross-sectional view of the pedal resistance and dampener assembly in a first stage 1 engaged braking pedal position taken along the longitudinal axis of the pedal resistance and dampener assembly.

FIG. 5 depicts the stage 1 position of the elements of the pedal resistance and dampener assembly or module or member 100 in a first partially engaged or braking or depressed position of the pedal 14 which initially results in the linear movement of the dampener force module 110 and the spring pedal resistance module or member or assembly 160 relative to each other and, more specifically, the linear movement of the dampener force module 110 relative to the stationary spring resistance module 160 which results in the linear movement of the sleeve 130 and the rod 140 and the piston 112 of the module 110 relative to the shroud 161 and the sleeve 150 of the module 160 and more specifically the linear movement of the rod 140 inwardly into the interior of the sleeve 150 of the module 160 thereby resulting in a displacement/compression of the dampener fluid located and moving through the interior of the respective chambers 134a, 134b, and 150c and the VER module 157 via the bore 140c in the rod 140 of the module 110 and the respective orifices 150d in the tube 150 of the module 160 to generate and create a dampening force on the pedal 14.

Figure 5A:
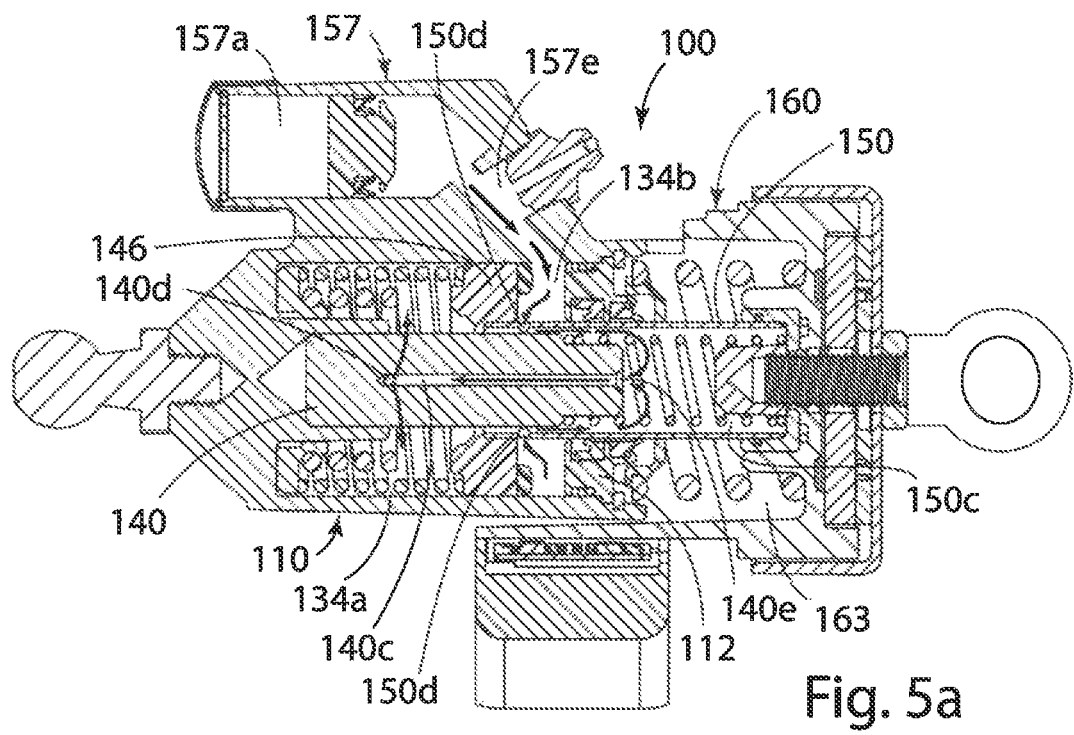
FIG. 5a is a vertical cross-sectional view of the pedal resistance and dampener assembly depicting the path of the flow of the dampener fluid through the pedal resistance and dampener assembly during a stage 1 engagement of the vehicle brake pedal.
Figure 8:
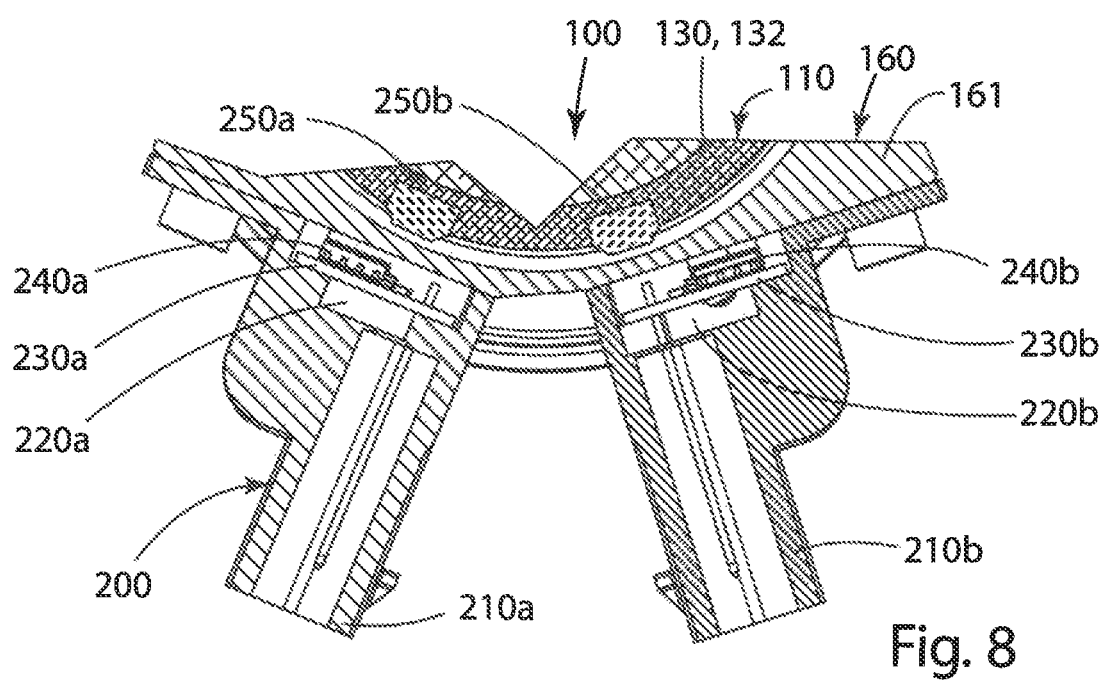
FIG. 8 is vertical cross-sectional view of the pedal resistance and dampener assembly taken along and through the combination pedal position/force sensor connector assembly.

More specifically, as shown in FIG. 5a in which the arrows depict the flow of dampener fluid through the assembly 100 during pedal engagement, the dampening fluid is located and flows through and into the fluid reservoir 157a and the fluid conduit 157e of the VER module 157; through and into the second interior chamber 134b of the dampener module 110 via the fluid conduit 157e in fluid flow communication with the second interior chamber 134b of the module 110; through and into the interior chamber 150c of the tube 150 of the module 160 via and through the plurality of orifices 150d in the tube 150 which are in fluid flow communication with both the second interior chamber 134b and the interior chamber 150c of the tube 150; from the chamber 150c through and into the bore 140c defined in the rod or shaft 140 of the dampener module 110 via and through the opening 140e in the radial end face of the rod or shaft 140; and into the first interior chamber 134a of the module 110 via and through the one or more fluid-flow orifices 140d extending between the central bore 140c and the exterior of the rod or shaft 140.

FIG. 5 also depicts the initial stage 1 position of the assembly 100 and specifically the compression of the stage 1 outer resistance spring 155 between the ring 146 and dampener module wall 131 in response to the linear movement of the module 110 relative to the module 160 and also the initial linear compression of the stage 1 inner resistance spring 167 between the shroud wall 162b and the shaft end 140b to generate a first initial stage 1 resistance force on the pedal 14.

Figure 6:
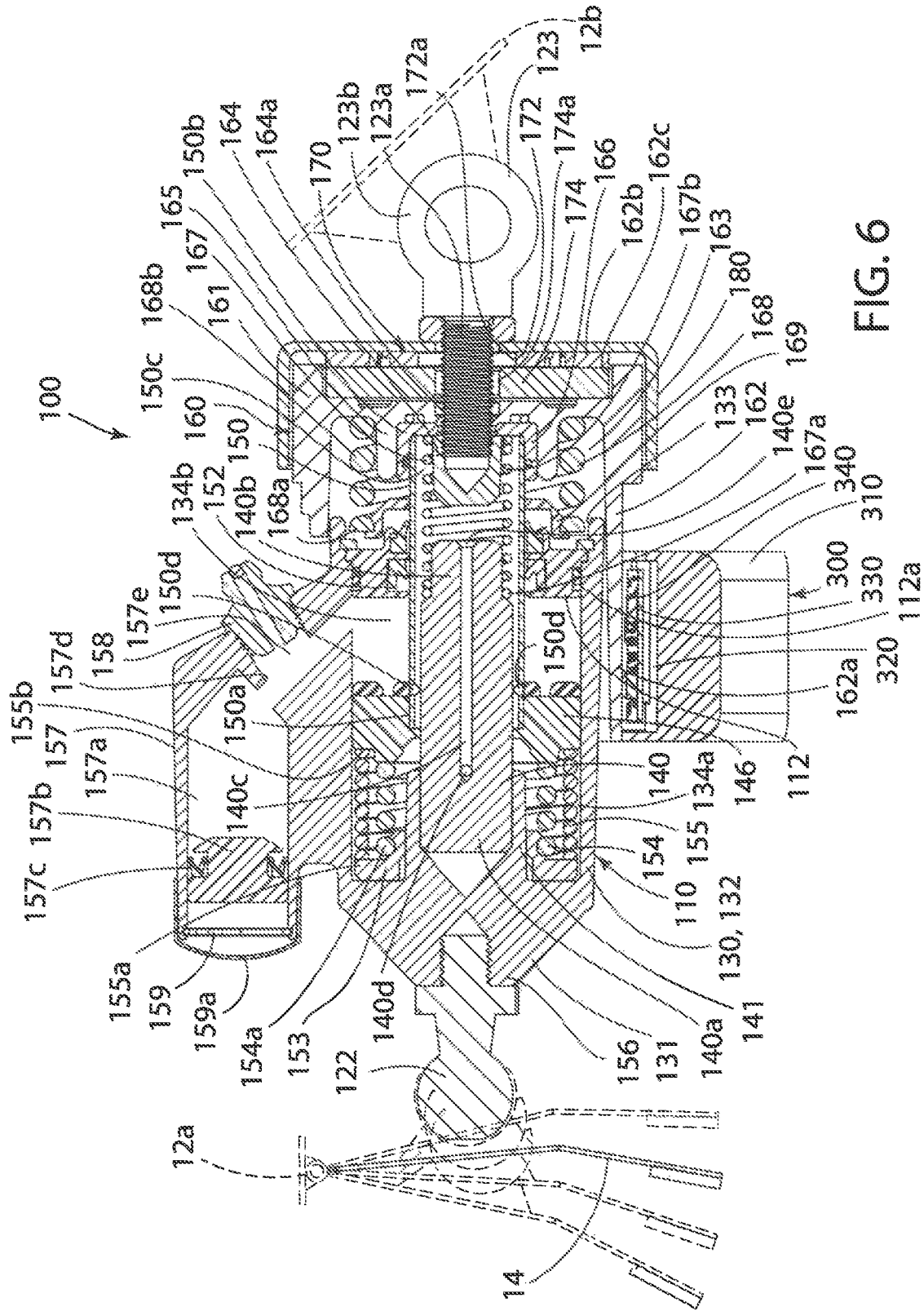
FIG. 6 is a vertical cross-sectional view of the pedal resistance and dampener assembly in a second stage 2 further engaged braking pedal position taken along the longitudinal axis of the pedal resistance and dampener assembly.

FIG. 6 depicts the stage 2 position of the elements of the pedal resistance and dampener assembly or module or member 100 in a second further partially engaged or braking or depressed position of the pedal 14 which results in the further linear movement of the dampener force module 110 relative to the spring pedal resistance module or member or assembly 160 which results in the further linear movement of the sleeve 130 and the rod 140 and the piston 112 of the module 110 relative to the shroud 161 and the sleeve 150 of the module 160 and, more specifically, the further linear movement of the rod 140 inwardly into the interior of the sleeve 150 of the module 160 thereby resulting in a further displacement/compression of the dampener fluid located and moving through the interior of the respective chambers 134a, 134b, and 150c and the VER module 157 to generate and create a further dampening force on the pedal 14.

FIG. 6 also depicts the stage 2 position of the assembly 100 and, more specifically, the further compression of the stage 1 outer resistance spring 155 between the ring 146 and dampener module wall 131 in response to the further linear movement of the modules 110 and 160 relative to each other, the further linear compression of the stage 1 inner resistance spring 167 between the shroud wall 162b and the shaft end 140b, and the linear compression of the stage 2 resistance spring 168 between the shroud wall 162b and the ring 112, for the generation of a stage 2 resistance force on the pedal 14.

Figure 7:
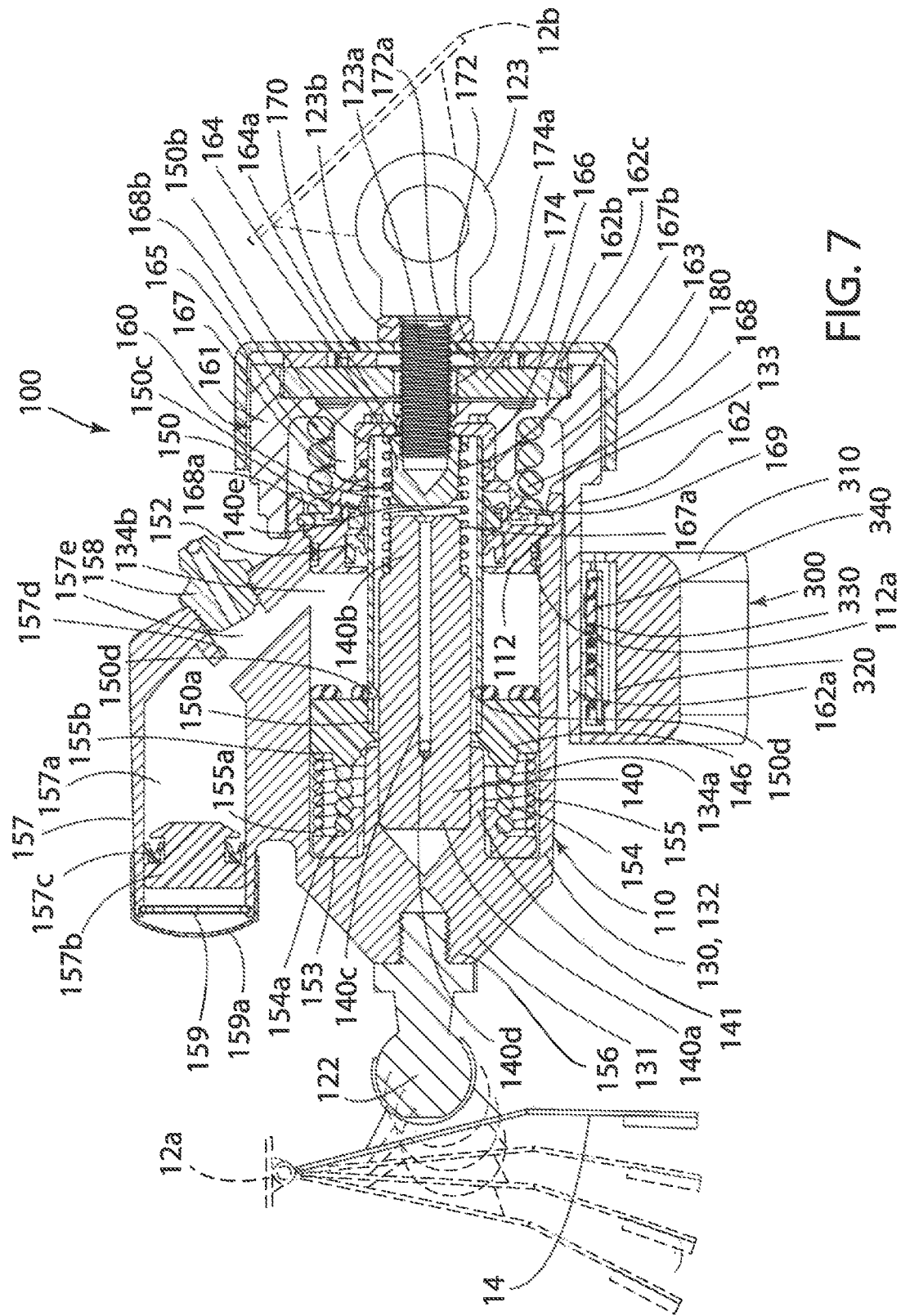
FIG. 7 is a vertical cross-sectional view of the pedal resistance and dampener assembly in a stage 3 fully engaged braking pedal position taken along the longitudinal axis of the pedal resistance and dampener assembly.

FIG. 7 depicts the stage 3 position of the elements of the pedal resistance and dampener assembly or module or member 100 in the fully engaged or braking or depressed position of the pedal 14 which results from the still further linear movement of the dampener force module 110 relative to the spring pedal resistance module or member or assembly 160 which results in the still further linear movement of the shroud 161 of the resistance module 160 which in turn results in the still further linear movement of the sleeve 130 and the rod 140 and the piston 112 of the module 110 relative to the shroud 161 and the sleeve 150 of the module 160 and, more specifically, the still further linear movement of the rod 140 inwardly into the interior of the sleeve 150 of the module 160 thereby resulting in a still further displacement/compression of the dampener fluid located and moving through the interior of the respective chambers 134a, 134b, and 150c and the VER module 157 to generate and create a still further dampening force on the pedal 14.

FIG. 7 also depicts the still further compression of the stage 1 outer resistance spring 155 between the ring seal or piston 146 and dampener module wall 131 in response to the still further linear movement of the modules 110 and 160 relative to each other, the still further linear compression of the stage 1 inner resistance spring 167 between the shroud wall 162b and the shaft end 140b, the further linear compression of the stage 2 spring between the shroud wall 162b and the piston 112, and the linear compression of the stage 3 resistance spring 154 between the dampener piston 146 and the dampener module wall 131, for the generation of a stage 3 resistance force on the pedal 14.

Thus, it is understood from the description above that the respective springs 154, 155, 167, and 168 are compressed (during pedal engagement) or de-compressed (during pedal disengagement) simultaneously in parallel during the full engagement or dis-engagement of the vehicle pedal 14 in a relationship with the two springs 155 and 167 being compressed or de-compressed simultaneously in parallel during a first portion of the linear movement of the modules 110 and 160 relative to each other as shown in FIG. 5 and further in a relationship with all four springs 154, 155, 167, and 168 being compressed or de-compressed simultaneously in parallel during additional portions of the movement of the modules 110 and 160 relative to each other as shown in FIGS. 6 and 7.

It is understood that the dampener force on the pedal 14 can be adjusted by varying the amount of fluid in the fluid VER housing 157 which in turn adjusts the amount of dampener fluid in the respective chambers 134a, 134b, and 150c which in turn results in a variance of the force required to move the module 110 relative to the module 160 which in turn results in a variance or adjustment of the dampening force applied to the pedal 14.

It is further understood that the dampener force on the pedal can be adjusted by varying the size of the bore 140c in the rod 140 of the module 110 and the size of the orifices 150c defined in the wall of the tube 150 of the module 160 for either increasing or decreasing the velocity of the fluid flow therethrough which in turn increases or decreases the fluid pressures which in turn increases or decreases the dampener force on the pedal 14.

It is understood that the linear movement of the resistance module 160 and the dampener module 110 relative to each other allows for the sensor 200 and, more specifically the pair of position sensors 240a and 240b to sense and measure the position of the dampener module 110 relative to the resistance module 160 thus allowing for the redundant sensing and measurement of the position of the vehicle pedal 14.

It is further understood that the depression of the vehicle pedal 14 results in the exertion of a linear compressive force by the bracket 123 against the force application plate 172 of the force module 170 in response to the linear movement of the modules 110 and 160 relative to each other in response to the engagement of the pedal 14 which results in the deformation of the force substrate 174 which in turn results in the generation of a pair of redundant force signals for sensing and measuring the force applied to the vehicle pedal 14.

FIGS. 9 through 12 depict another embodiment of a linear pedal resistance and dampener assembly or module or member 1000 in accordance with the present invention in which the same numerals as used in connection with the description and drawings relating to assembly 100 have been used to identify those elements in the assembly 1000 which are the same of the elements in the assembly 100 and thus the description of the elements and features of the assembly 100 are incorporated herein by reference in connection with the description of the elements and features of the assembly 1000.

A description of the differences in the elements and features of the respective assemblies 100 and 1000 follows.

Figure 9:
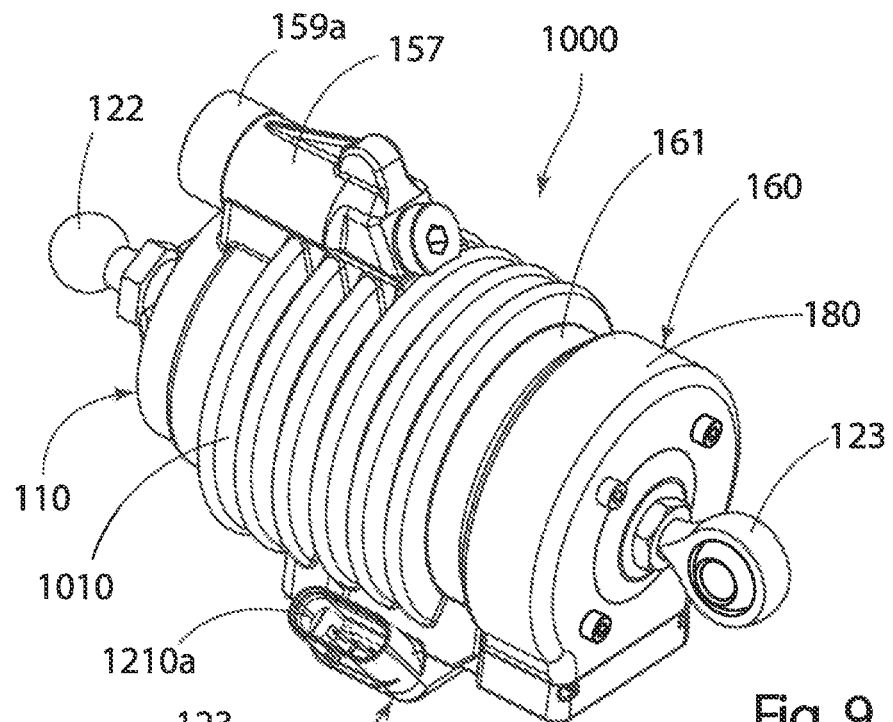
FIG. 9 is a perspective view of another embodiment of a pedal resistance and dampener assembly in accordance with the present invention.
Figure 10:
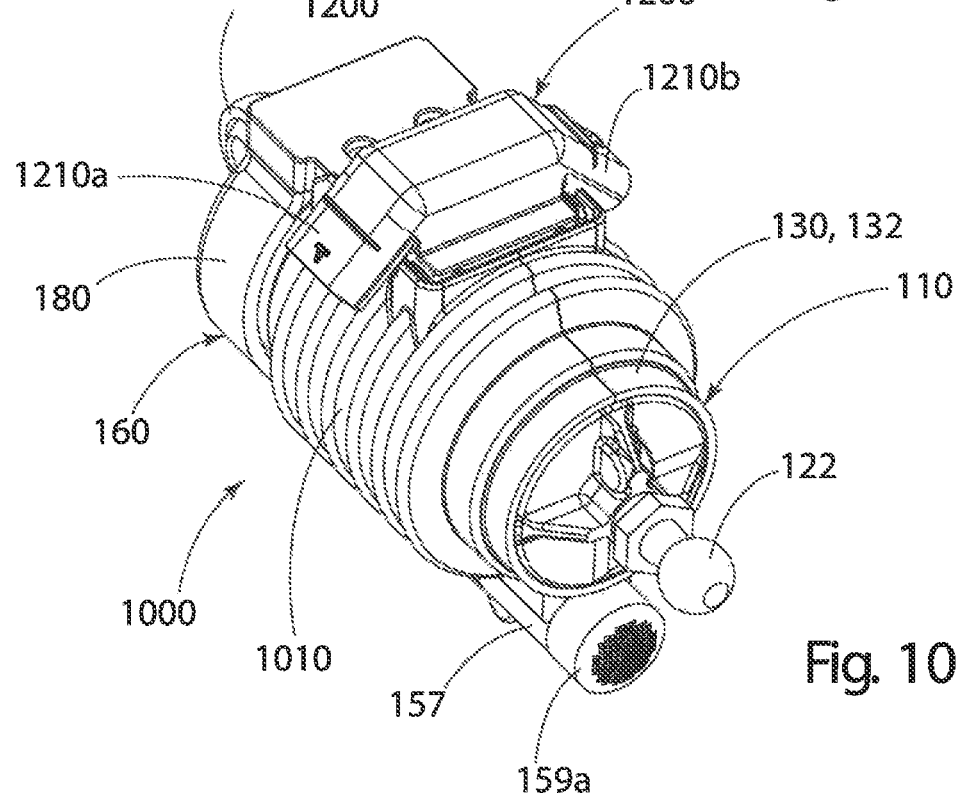
FIG. 10 is another perspective view of the pedal resistance and dampener assembly shown in FIG. 9.

Initially, as shown in FIGS. 9 and 10, the assembly 1000 includes an exterior accordion shaped boot or shroud 1010 that surrounds portions of the respective modules 110 and 160 and acts as debris cover.

Additionally, the module 110 incorporates an alternate seal or ring structure 1146 that incorporates a pair of internal one-way fluid relief valves 1146a and 1146b. In accordance with this embodiment as shown more particularly in FIG. 11a, the relief valves 1146a and 1146b are intended to allow for the one-way flow of dampener fluid directly from the second chamber 134b of the module 110 into the first chamber 134a of the module 110 when the pedal 14 is being returned from an engaged position to its rest or idle position for the purpose of reducing the dampening force on the pedal 14 during the disengagement portion of the travel of the pedal 14.

Further, the module 110 includes a rod or shaft 140 that defines an interior chamber 140c terminating in an opening 140e in a radial end face of the rod or shaft 140 and further defining one or more orifices or apertures 140d in the exterior circumferential wall thereof and in fluid-flow communication with the interior chamber 140c and the chamber 134a.

Figure 11:
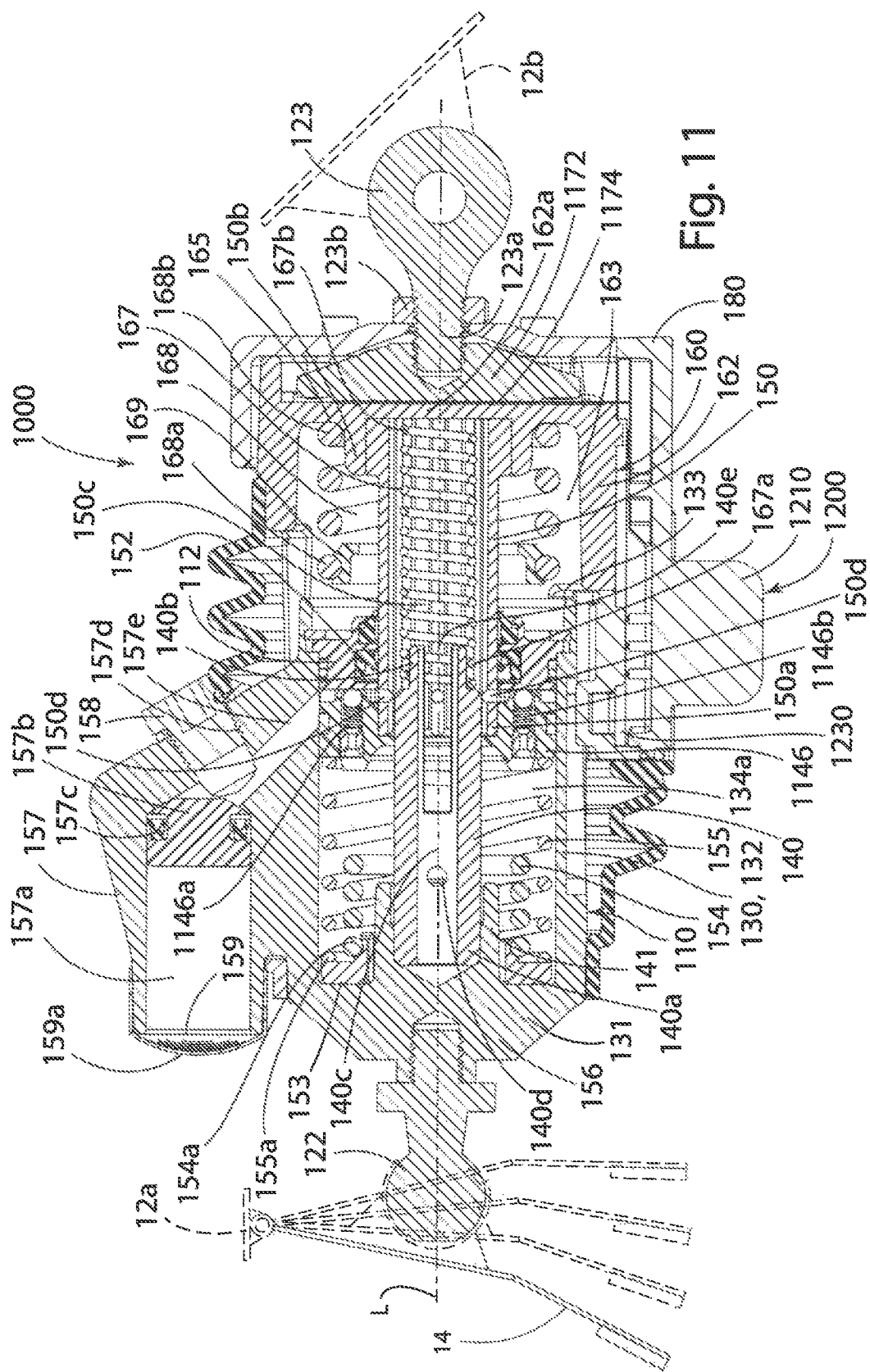
FIG. 11 is a vertical cross-sectional view of the pedal resistance and dampener assembly of FIGS. 9 and 10 in a rest or disengaged or non-braking pedal position taken along the longitudinal axis of the pedal resistance and dampener assembly.
Figure 11A:
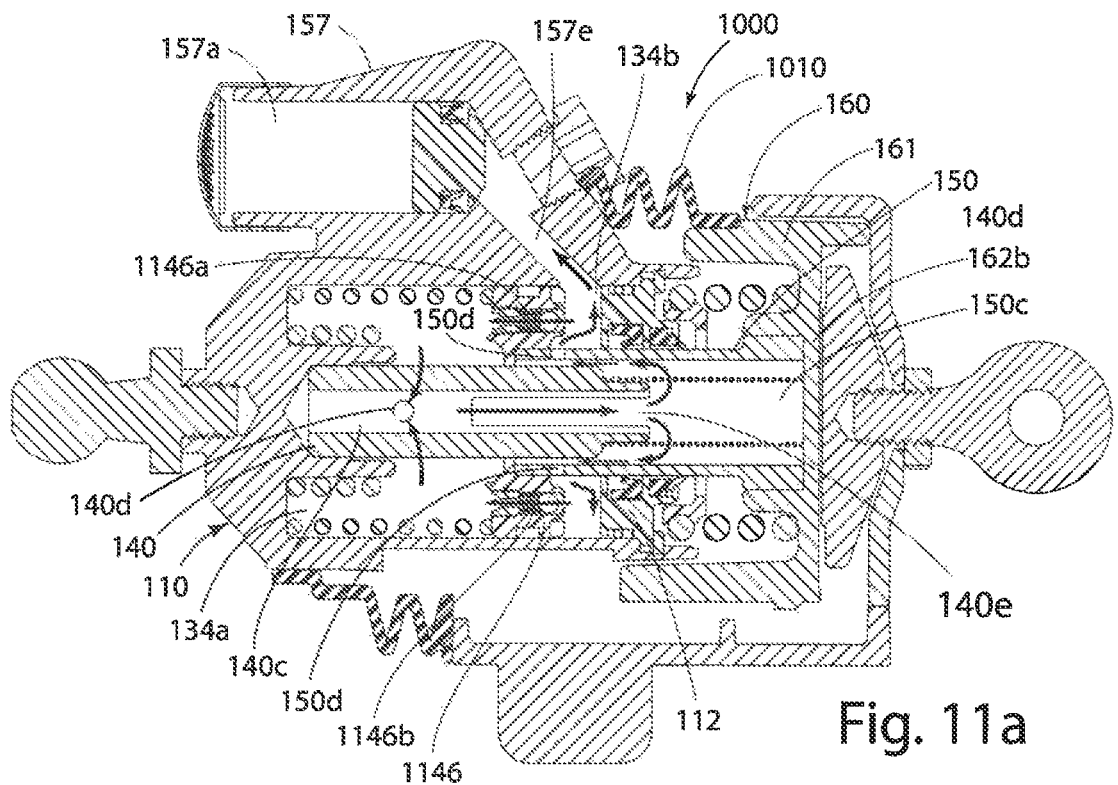
FIG. 11a is a vertical cross-sectional view of the pedal resistance and dampener assembly of FIGS. 9 and 10 depicting the path of the flow of the dampener fluid through the pedal resistance and dampener assembly during a pedal disengagement stage.
Figure 12:
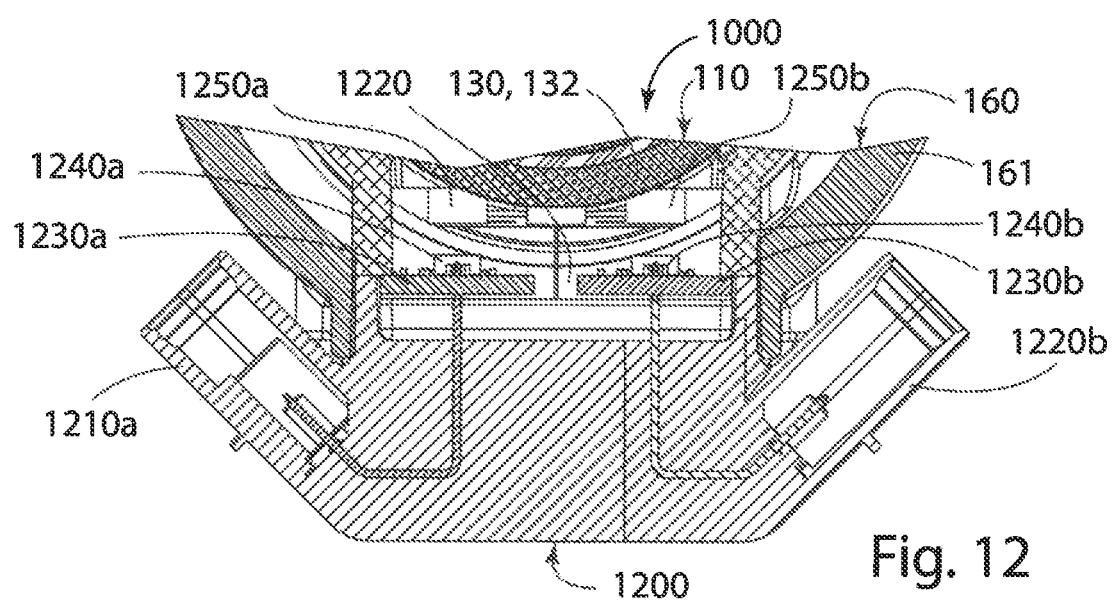
FIG. 12 is vertical cross-sectional view of the pedal resistance and dampener assembly of FIGS. 9 and 10 taken along and through the pedal position/force sensor connector assembly.

Thus, in the embodiment as shown in FIGS. 9 and 10, and as more particularly shown in FIG. 11a in which the arrows depict the flow of dampener fluid during pedal disengagement, the dampener fluid is adapted to flow through the assembly 1000 between and through the conduit 157e of the VER module 157 and the chamber 134b of the dampener module 110; between and through the chamber 134b of the dampener module 110 and the interior chamber 150c of the tube 150 of the resistance module 160 via the orifices 150d defined in the exterior circumferential wall of the tube 150; between and through the interior chamber 150c of the tube 150 of the resistance module 160 and the interior chamber 140c of the rod or shaft 140 in the dampener module 110 via the opening 140e defined in the radial end face of the rod or shaft 140; and between and through the rod or shaft 140 and the interior chamber 134a of the dampener module 110 via the one or more orifices or through-holes 140d defined in the exterior circumferential wall of the rod or shaft 140 of the dampener module 110.

Still further, the module 160 incorporates a force sensor assembly or member 1170 comprising a strip force sensitive resistor 1174 located in the interior of the module 160 between the radial end wall 162a of the module 160 and a force sensor plate 1172 which is also located in the interior of the module 160 and is threadingly secured to the eyelet bracket 123 that is secured to the vehicle bracket/floor 12b.

In accordance with this embodiment of the force sensor member 1170, the relative movement between the respective modules 110 and 160 in response to the engagement or disengagement of the vehicle pedal 14 results in the application or removal of a compressive force by the plate 1172 on the force sensitive resistor 1174 which results in the deformation of the resistor 1174 and the generation of a pair of force sensor signals for sensing and measuring the force being applied to the pedal 14.

Still further, the assembly 1000 incorporates an alternate embodiment of a combination pedal position and force sensor/sensing connector assembly or module or member 1200 including a pair of electrical connectors 1210a and 1210b coupled to and protruding outwardly from the exterior of the pedal resistance module 160 in a generally wing-shaped configuration and relationship and, more specifically, coupled to and protruding outwardly from the exterior face of the wall 162 of the shroud 161 of the pedal resistance module 160.

The connector assembly 1200 defines a single interior housing 1220 for a pair of printed circuit boards 1230a and 1230b including a pair of position sensing integrated circuits or sensors 1240a and 1240b respectively such as for example respective Hall Effect sensor ICs adapted for sensing a change in the magnitude or direction of a magnetic field generated by a pair of respective magnets 1250a and 1250b embedded into the wall 132 of the sleeve 130 of the dampener module 110 in response to the movement of the modules 110 and 160 relative to each other for sensing and measuring the position of the vehicle brake pedal 14. In the embodiment shown, the respective magnets 1250a and 1250b are positioned in a relationship opposed and spaced from the respective Hall Effect ICs 1240a and 1240b. The assembly 1000 includes a pair of pedal position sensors 1240a and 1240b for redundancy purposes.

It is also understood that the pair of force sensor signals generated by the force sensitive resistor 1174 of the force sensor assembly 1170 are transferred to the vehicle control unit via the respective connectors 1210a and 1210b.

Numerous other variations and modifications of the embodiments of the pedal resistance assembly and pedal force/position sensors of the present invention as described above may be effected without departing from the spirit and scope of the novel features of the invention. It is to be understood that no limitations with respect to the embodiments illustrated herein are intended or should be inferred. It is, of course, intended to cover by the appended claims all such modifications as fall within the scope of the claims.

What is claimed is:

1. A vehicle pedal resistance and dampener assembly comprising:
   a dampener module defining an interior fluid-filled cavity and adapted for generating a dampening force on a vehicle pedal;
   a resistance module adapted for generating a resistance force on the vehicle pedal, the dampener module and the resistance module being moveable relative to each other;
   a sleeve in the dampener module defining the interior fluid-filled cavity;
   a shaft in the cavity of the dampener module;
   a fluid-filled interior sleeve in the resistance module, the shaft of the dampener module extending into the sleeve of the resistance module;
   a first ring seal surrounding the sleeve of the resistance module;
   a second ring seal surrounding and moveable relative to the sleeve of the resistance module;
   a first resistance spring in the resistance module extending between an end of the resistance module and the shaft of the dampener module;
   a second resistance spring in the resistance module surrounding and spaced from the sleeve of the resistance module;
   a third resistance spring in the dampener module extending from an end of the dampener module and surrounding the shaft in the dampener module;
   a pedal position sensor assembly for sensing and measuring the position of the vehicle pedal; and
   a pedal force sensor assembly for sensing and measuring the force on the vehicle pedal.

2. The vehicle pedal resistance and dampener assembly of claim 1 further comprising:
   a fourth resistance spring in the resistance module surrounding the third resistance spring and extending between the end of the dampener module and the first ring seal.

3. The vehicle pedal resistance and dampener assembly of claim 1 wherein the pedal position sensor assembly includes a magnet on one of the dampener module and the resistance module and a position sensor on the other of the dampener module and the resistance module.

4. The vehicle pedal resistance and dampener assembly of claim 1 wherein the pedal force sensor assembly includes a pedal force application plate and a pedal force resistor substrate on the resistance module.

5. The vehicle pedal resistance and dampener assembly of claim 1 wherein the dampener module, the resistance module, and the pedal force sensing module are positioned in a relationship co-linear with each other and the longitudinal axis of the resistance and dampener assembly.

6. A vehicle pedal resistance and dampener assembly for a vehicle pedal comprising:
   a pedal resistance member including an interior fluid-filled sleeve;
   a pedal dampener member including a shaft in a fluid-filled interior chamber, the shaft extending into the sleeve of the pedal resistance member;
   a first pedal resistance spring in the sleeve of the pedal resistance member;
   a second pedal resistance spring surrounding the sleeve of the pedal resistance member;
   a third pedal resistance spring surrounding the shaft of the pedal dampener member; and
   a fourth pedal resistance spring surrounding the third pedal resistance spring;
   the pedal resistance member and the pedal dampener member being moveable relative to each other and the shaft and the sleeve being moveable relative to each other.

7. The vehicle pedal resistance and dampener assembly of claim 6 further comprising:
   a first ring seal surrounding and fixed to the sleeve of the pedal resistance member; and
   a second ring seal surrounding and moveable relative to the sleeve of the pedal resistance member in response to the movement of the pedal dampener member and the pedal resistance member relative to each other.

8. The vehicle pedal resistance and dampener assembly of claim 7 wherein the interior sleeve of the pedal dampener member defines first and second interior fluid-filled chambers separated by the first ring seal.

9. The vehicle pedal resistance and dampener assembly of claim 8 further comprising:
   one or more openings defined in an exterior wall of the sleeve of the pedal resistance member for providing fluid-flow communication between the fluid-filled sleeve of the pedal resistance member and the second interior fluid-filled chamber of the pedal dampener member; and
   one or more openings defined in the shaft of the pedal dampener member for providing fluid-flow communication between the fluid-filled sleeve of the pedal resistance member and the first interior fluid-filled chamber of the pedal dampener member.

10. The vehicle pedal resistance and dampener assembly of claim 6 further comprising a pedal position sensor assembly including:
a magnet associated with one of the pedal dampener and pedal resistance members; and
a pedal position sensor associated with the other of the pedal dampener and pedal resistance members.

11. The vehicle pedal resistance and dampener assembly of claim 6 further comprising a pedal force sensor assembly including:
a pedal force sensor; and
a plate adapted to exert a force against the pedal force sensor in response to the movement of the pedal dampener member and the pedal resistance member relative to each other.

12. A vehicle pedal resistance and dampener assembly comprising:
a resistance module including a fluid-filled interior sleeve;
a dampener module including a shaft extending into the sleeve of the resistance module and defining a fluid-filled chamber, the resistance module and the dampener module being moveable relative to each other; a first pedal resistance spring located in the sleeve of the resistance module and extending between an end of the resistance module and the shaft of the dampener module;
a second pedal resistance spring located in the resistance module and surrounding the sleeve of the resistance module;
a third pedal resistance spring in the chamber of the dampener module;
a fourth pedal resistance spring in the chamber of the dampener module surrounding the third pedal resistance spring in the chamber of the dampener module;
a first ring seal surrounding and fixed to the sleeve of the resistance module, the third and fourth pedal resistance springs located between an end of the dampener module and the first ring;
a second ring seal surrounding and moveable relative to the sleeve of the resistance module, the second pedal resistance spring located between the end of the resistance module and the second ring seal; and
a pedal position sensor assembly including a magnet on one of the dampener module or the resistance module and a position sensor on the other of the dampener module or the resistance module.

13. The vehicle pedal resistance and dampener assembly of claim 12 further comprising a pedal force sensor on the resistance module.

* * * * *